United States Patent [19]
Kotani et al.

[11] Patent Number: 5,745,813
[45] Date of Patent: Apr. 28, 1998

[54] CAMERA PROVIDED WITH A REAR SURFACE SWITCH

[75] Inventors: Noriyasu Kotani, Tokyo; Kiyosada Machida, Urawa; Minoru Katoh; Junichi Omi, both of Kawasaki; Hiroshi Wakabayashi, Yokohama, all of Japan

[73] Assignee: Nikon Corporation, Tokyo, Japan

[21] Appl. No.: 635,645

[22] Filed: Apr. 22, 1996

[30] Foreign Application Priority Data

Apr. 21, 1995 [JP] Japan .................... 7-097297

[51] Int. Cl.$^6$ ............................ G03B 17/00
[52] U.S. Cl. .............. 396/440; 396/535; 396/543
[58] Field of Search ........................ 396/440, 441, 396/442, 535, 536, 543; 352/221, 225, 227

[56] References Cited

U.S. PATENT DOCUMENTS

| | | | |
|---|---|---|---|
| 4,444,482 | 4/1984 | Kobayashi | 396/440 |
| 5,448,334 | 9/1995 | Kaihara et al. | 396/543 |
| 5,473,401 | 12/1995 | Tsunefuji | 396/536 |

Primary Examiner—A. A. Mathews
Attorney, Agent, or Firm—Oliff & Berridge, P.L.C.

[57] ABSTRACT

A camera provided with a rear surface switch includes a pressure plate. The pressure plate maintains film in a flattened alignment within a film exposure region of the camera. An external cover encloses a rear of the pressure plate. A switch includes a movable operational member that protrudes from the cover. An electrical conductive member is attached to the rear of the pressure plate. An electrical signal is output in accordance with the movement of the operational member. The operational force resulting from the movement of the operational member is supported by the pressure plate.

9 Claims, 3 Drawing Sheets

CAMERA PROVIDED WITH A REAR SURFACE SWITCH

BACKGROUND OF THE INVENTION

1. Field of the Invention

This invention relates to a camera that has a rear surface switch.

2. Description of Related Art

Conventional cameras have a pressure plate attached, via a plate spring, to an inner surface of a rear cover. The rear cover covers an aperture in the rear of the camera. When the rear cover is closed, a film passageway is defined by the pressure plate and rails provided within the camera, above and below the aperture. This structure maintains the film in a flattened alignment within the passageway.

The operational force of a pressure switch attached to the rear cover of a conventional camera, or to a data pack provided in lieu of the rear cover, transmits a load to a support plate. The load is transmitted to the support plate because the pressure plate is attached to the cover by the plate spring. Alternatively, the contact pressure of sliding elements of a sliding switch attached to the rear cover of a conventional camera, or to a data pack provided in lieu of the rear cover, also transmits a load to a support plate. Both of these mechanisms prevent the camera from being compact, increase the number of component parts, and increase the cost of the camera.

SUMMARY OF THE INVENTION

It is, therefore, an object of the present invention to provide a camera wherein the operational force of a pressure switch or a slide switch, attached to the rear surface of the camera, is not transmitted to a support plate. Instead, the pressure plate completely supports the operational force of the switch.

A camera provided with a rear surface switch in accordance with the invention includes a pressure plate. The pressure plate maintains the film in a flattened alignment at a rear surface of a film exposure region of the camera. An external cover encloses a rear surface of the pressure plate. A switch is provided with an operational member. The operational member protrudes from the external cover. The pressure plate has an electrical conductive member. Normally, the electrical conductive member is adjacent the operational member. However, when the operational member is depressed, it contacts the electrical conductive member at the rear surface of the pressure plate. The force transmitted to the electrical conductive member from the operational member is supported by the pressure plate.

Alternatively, the camera can be provided with a rear surface switch that includes a sliding element attached to the operational member. Electrical conductive components are provided at the rear surface of the pressure plate. When the switch is actuated, the sliding element contacts the electrical conductive components. A signal is output that corresponds to the contact position. The operational force of the switch and the sliding element is supported by the pressure plate.

Furthermore, since the present invention can be easily divided by the operational items of the means for overcoming the problems referred to in the above explanation of the present invention, utilization has been made of diagrams which show actual embodiments; however, the present invention is by no means limited to these embodiments.

DETAILED DESCRIPTION OF PREFERRED EMBODIMENTS

Figure 1:
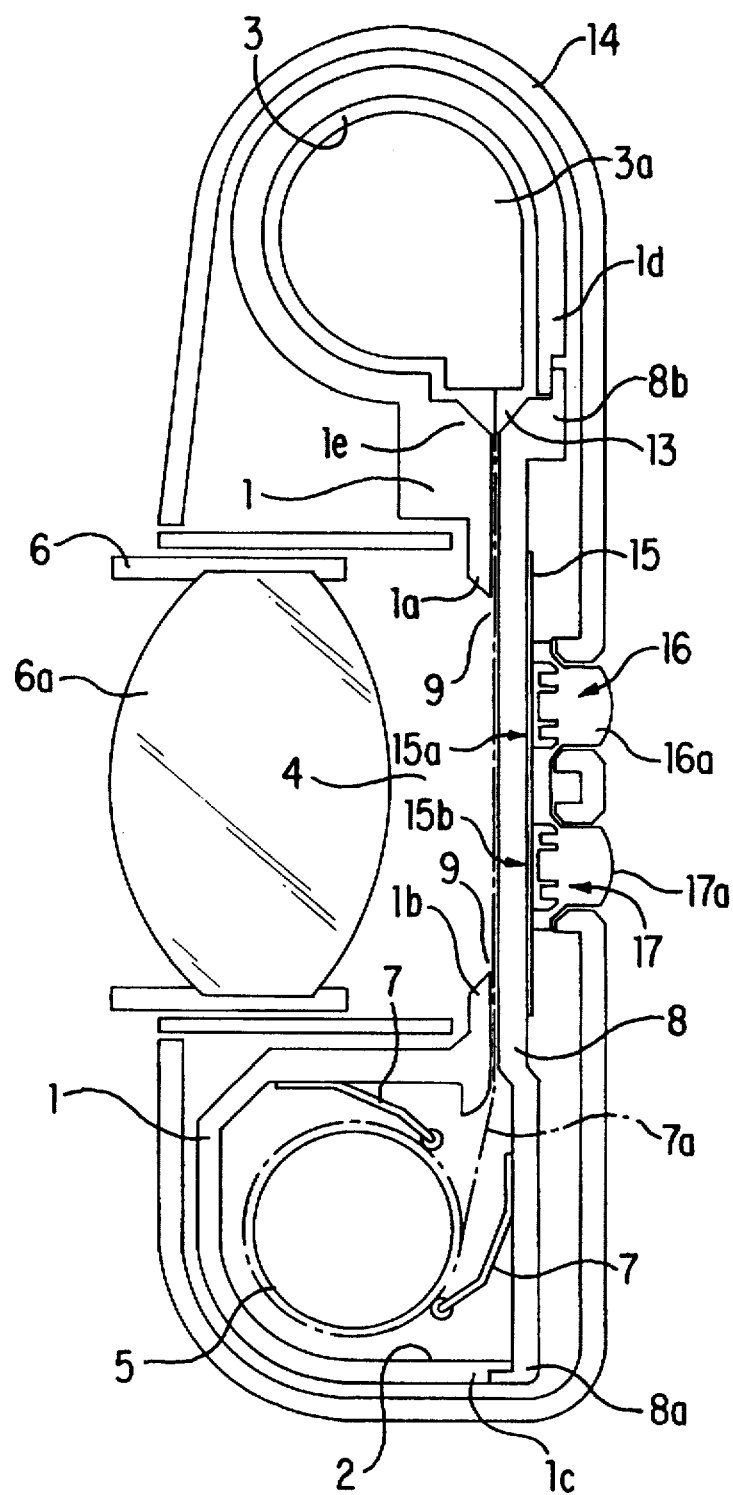
FIG. 1 is a broken-away top elevational view of a camera provided with a rear surface switch, according to the present invention.
Figure 2:
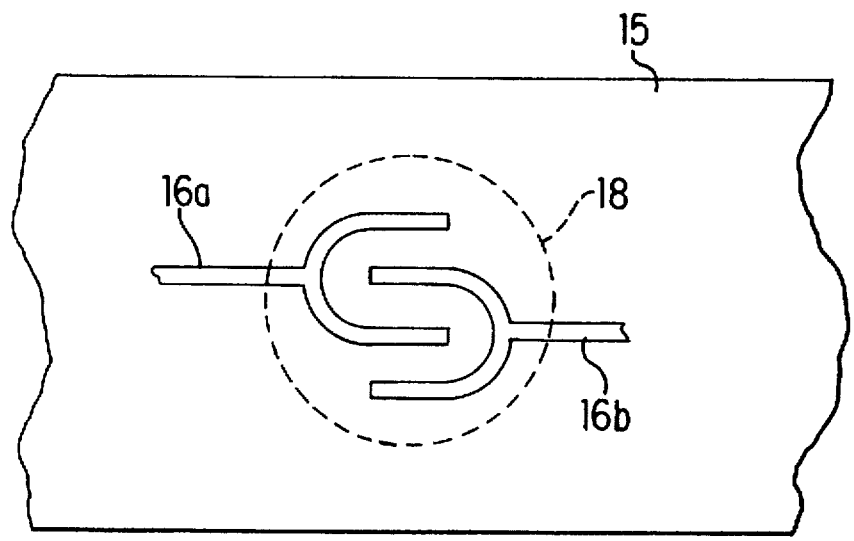
FIG. 2 is a diagram showing an electrically conductive member of the camera of FIG. 1.

FIG. 1 is a broken-away top elevational view of a camera provided with a rear surface switch, according to the present invention. A spool chamber 2 is formed on a left side of a camera body 1. A cartridge chamber 3 is formed on a right side of the camera body 1. A dark box 4 is formed between the spool chamber 2 and the cartridge chamber 3. A drive mechanism (not shown) rotates a spool 5 in the spool chamber 2. A lens barrel 6 is disposed in the dark box 4 at the front of the camera. A lens 6a is disposed in the lens barrel 6. A film cartridge 3a fills the cartridge chamber 3. A film pressure mechanism 7 is disposed in the spool chamber 2. The film pressure mechanism 7 presses the surface of film 7a that is wrapped around the spool 5.

A pressure plate 8 is attached to the rear of the camera body 1. A film pathway 9 is formed between the front of the pressure plate 8 and aperture walls 1a and 1b of the camera body 1. The film 7a travels along the film pathway 9. A left edge 8a of the pressure plate 8 is attached to a left end 1c of the camera body 1. The left edge 8a of the pressure plate 8 defines a wall of the spool chamber 2. A right edge 8b of the pressure plate 8 is attached to a right edge 1d of the camera body 1. The pressure plate 8 is rigidly fixed to the camera body 1 by screws (not shown).

A film removal and insertion pathway 13 of the cartridge chamber 3 is formed between camera wall 1e of the camera body 1 and the right edge 8b of the pressure plate 8. The film removal and insertion pathway 13 is tapered in the direction of film travel. The film 7a travels smoothly from the cartridge 3a and into the film pathway 9 because the film removal and insertion pathway 13 is tapered.

An external cover 14 encloses the camera body 1. The external cover 14 is attached to the rear surface of the camera body 1. The external cover 14 does not open and shut. The bottom of the camera body 1 defines a cartridge opening (not shown). The cartridge opening is opened and closed by a cartridge lid (not shown).

A flexible print base plate 15 is attached to the rear surface of the pressure plate 8 by two sided tape. Gear shaped electrical conductive patterns 116a and 116b are formed on the rear surface of the base plate 15 at sections 15a and 15b. Operational members 16 and 17 straddle patterns 116a and 116b. The operational members 16 and 17 contact the base plate 15 and patterns 116a and 116b at area 18 when the operational members 16 and 17 are forced toward the interior of the camera. The portion of the operational members 16 and 17 that contacts the contact area 18 is formed of electrically conductive rubber.

One of the operational members 16 and 17 has an opening that faces sections 15a and 15b of the base plate 15. Each of the operational members 16 and 17 has a head 16a and 17a that protrudes from the external cover 14. The electrically conductive patterns 116a and 116b are short-circuited when the heads 16a and 17a of operational members 16 and 17 are depressed. The operational members 16 and 17 can provide mode switches for selecting photographic conditions, such as flash photography.

The base plate 15 is adhered to the rear surface of the pressure plate 8. The pressure plate 8 is rigidly secured to the camera body 1. The operational force of the operational members 16 and 17 is supported by the pressure plate 8.

Figure 4:
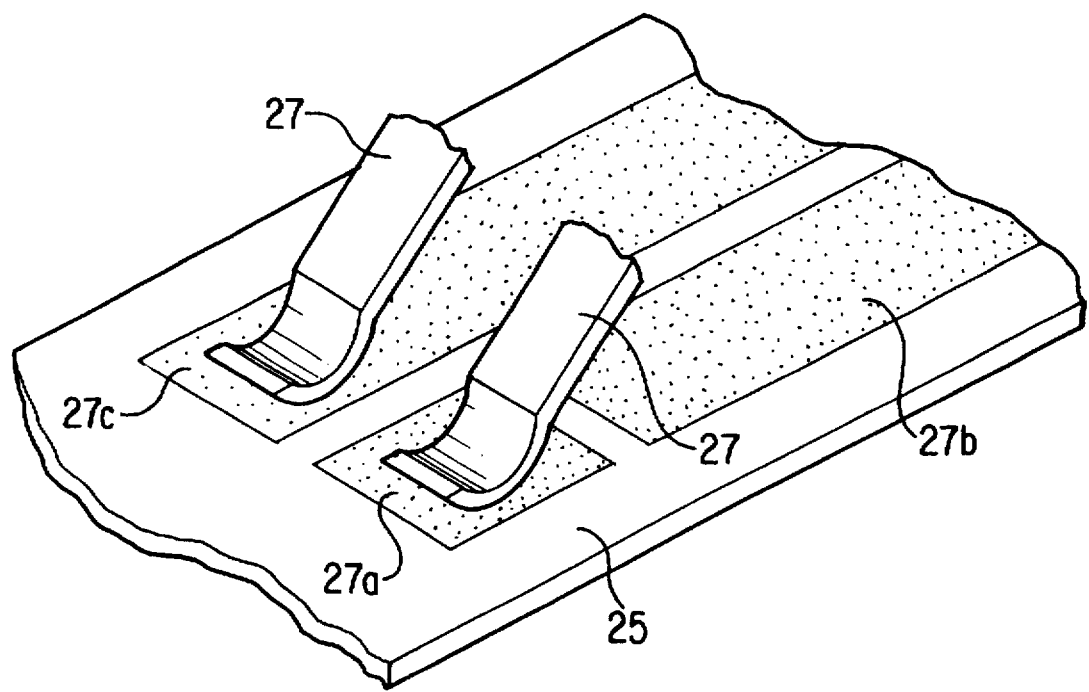
FIG. 4 is a diagram showing electrically conductive components of the camera of FIG. 2.
Figure 3:
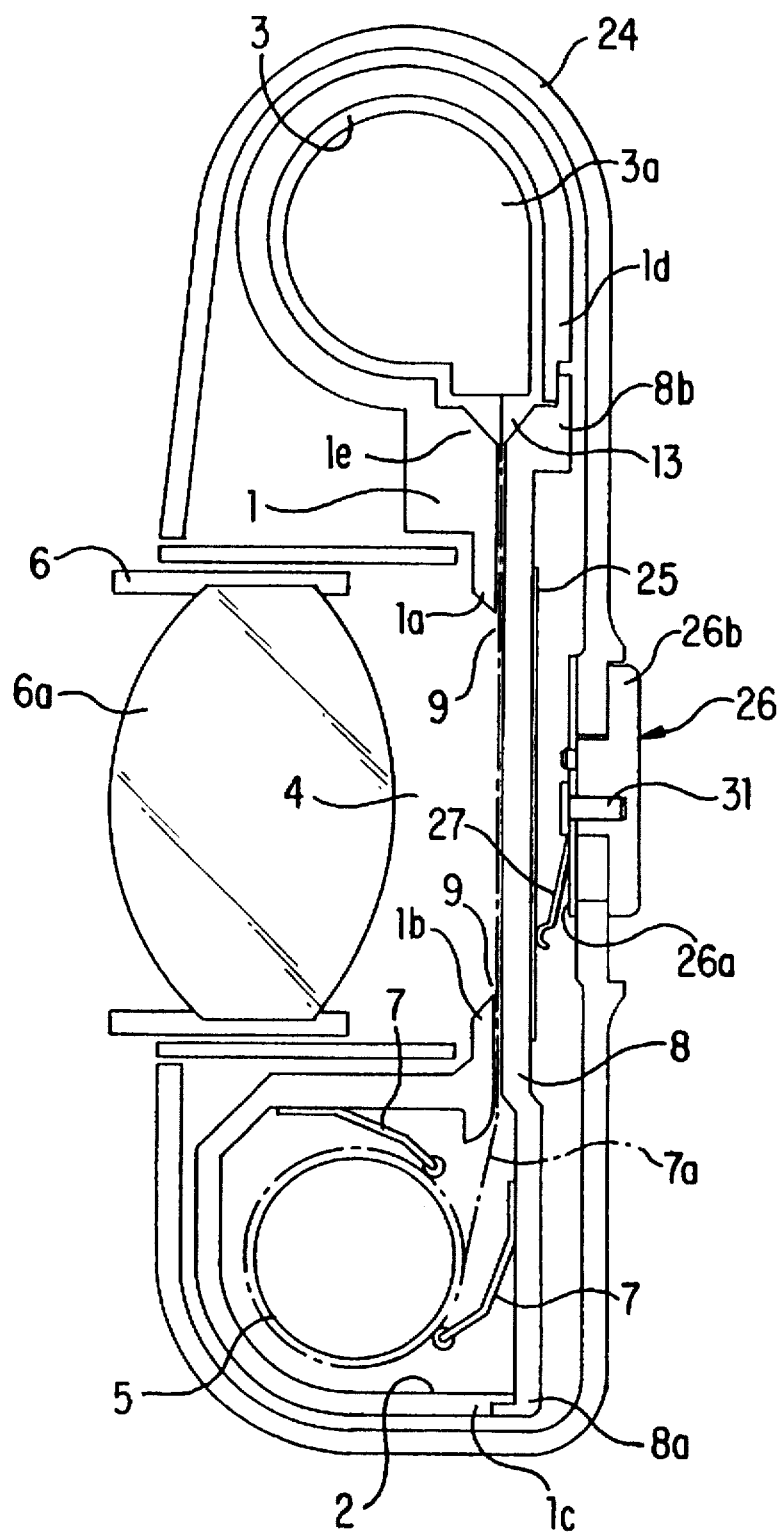
FIG. 3 is a broken-away top elevational view of a camera provided with a rear surface switch, according to another embodiment of the invention.

FIG. 3 is a broken-away top elevational view of a camera provided with a rear surface switch, according to another embodiment of the invention. Elements of the alternative embodiment that are the same as the elements shown in FIG. 1 are marked with the same reference numbers. A flexible print base plate 25 is attached to a rear surface of a pressure plate 8. As shown in FIG. 4, electrical conductive patterns 27a, 27b, and 27c are formed on a rear surface of the base plate 25. An operational member 26 is slidingly attached to an external cover 24. The operational member 26 includes a rear strike plate 26a and a slide knob 26b. The external cover 24 is disposed between the strike plate 26a and the slide knob 26b. Screws 31 attach the external cover 24 to the strike plate 26a and the slide knob 26b.

The operational member 26 slides vertically, as shown in FIG. 4. A pair of moveable sliding elements 27 are jointly secured to the operational member 26 by screws 31. The sliding elements 27 move along the electrical conductive patterns 27a, 27b, and 27c of the base plate 25 when the operational member 26 slides vertically. A signal is subsequently emitted which corresponds to the contact position of the electrical conductive patterns 27a, 27b, and 27c. The operational force of the operational member 26 and the sliding element 27 is supported by the pressure plate 8.

The base plates 15 and 25 of the embodiments shown in FIGS. 1 and 3 are attached to the pressure plate 8. The film slides along the base plate 8 as it travels along the film pathway 9. The sliding of the film electrically charges the pressure plate 8 with electrostatic electricity. Conventionally, a lead line is provided to ground the pressure plate. However, the invention includes a base plate 15 and 25 attached to the rear surface of the pressure plate 8. A solder bridge contacting the base plate can, therefore, be used to disperse the static electricity of the pressure plate 8.

The pressure plate of the invention supports the contact pressure of movable sliding elements of a sliding switch. Alternatively, the pressure plate can support the operational force of a pressure switch protruding from an external cover. The invention obviates additional supporting members to carry such force. The invention, therefore, enables cameras to be manufactured smaller and less expensively.

What is claimed is:

1. A camera for use with film and having a film exposure region, comprising:

a pressure plate having a rear that maintains the film in a substantially flattened alignment within the film exposure region of the camera;

a cover that encloses the rear of the pressure plate;

a switch that includes a movable operational member that protrudes from the cover; and an electrical conductive member at the rear of the pressure plate;

whereby an electrical signal is output in accordance with the movement of the operational member, and operational force resulting from the movement of the operational member is supported by said pressure plate.

2. The camera according to claim 1, wherein the switch includes a pressure switch, such that the operational member contacts the electrical conductive member when the operational member is pushed into an interior of the camera, the contact resulting in the output of the electrical signal.

3. The camera according to claim 1, wherein the switch includes a sliding switch, the sliding switch includes a sliding element attached to the operational member, such that the sliding element moves along the electrical conductive member when the operational member is moved along the cover, whereby an electrical signal is output that corresponds to the position of the sliding element on the electrical conductive member.

4. A camera for use with film and having a film exposure region, comprising:

pressure plate means having a rear for maintaining the film in a substantially flattened alignment within the film exposure region of the camera;

cover means for enclosing the rear of the pressure plate means;

switch means for actuating said camera between various modes of operation, said switch means including a movable operational member that protrudes from the cover; and electrical conductive means at the rear of the pressure plate means for conducting electricity;

whereby an electrical signal is output in accordance with the movement of the operational member, and operational force resulting from the movement of the operational member is supported by said pressure plate means.

5. The camera according to claim 1, wherein the switch means includes a pressure switch, such that the operational member contacts the electrical conductive means when the operational member is pushed into an interior of the camera, the contact resulting in the output of the electrical signal.

6. The camera according to claim 1, wherein the switch means includes a sliding switch, the sliding switch includes a sliding element attached to the operational member, such that the sliding element moves along the electrical conductive means when the operational member is moved along the cover, whereby an electrical signal is output that corresponds to the position of the sliding element on the electrical conductive means.

7. A method of actuating a camera between various modes of operation comprising the steps of:

maintaining film in a substantially flattened alignment within a film exposure region of a camera with a pressure plate having a rear;

enclosing the rear of the pressure plate with a cover;

actuating the camera between various modes of operation with a switch having a movable operational member;

outputting an electrical signal in accordance with the movement of the operational member relative to an electrical conductive member at the rear of the pressure plate; and supporting operational force resulting from the movement of the operational member with the pressure plate.

8. The method of claim 7, wherein the outputting step includes pushing the operational member into an interior of the camera whereby the operational member contacts the electrical conductive member.

9. The method of claim 7, wherein the outputting step includes sliding a sliding element attached to the operational member along the electrical conductive member, whereby an electrical signal is output that corresponds to the position of the sliding element on the electrical conductive member.

* * * * *